United States Patent [19]

Chalupa

[11] Patent Number: 5,356,097
[45] Date of Patent: Oct. 18, 1994

[54] SEGMENTED SAFETY AIRCRAFT

[76] Inventor: Stefan Chalupa, 11508 Ridgely Rd., Ridgely, Md. 21660

[21] Appl. No.: 58,328

[22] Filed: May 10, 1993

[51] Int. Cl.⁵ .................. B64D 1/12; B64D 25/18; B64D 25/12
[52] U.S. Cl. .................. 244/139; 244/100 A; 244/107; 244/118.2; 244/137.3; 244/2
[58] Field of Search ............ 244/2, 100 A, 107, 118.2, 244/120, 122 A, 137.3, 137.4, 139, 140, 141

[56] References Cited

U.S. PATENT DOCUMENTS

| | | | |
|---|---|---|---|
| 3,028,130 | 4/1962 | Burton | 244/118.2 |
| 3,724,788 | 4/1973 | Petry et al. | 244/137.3 |
| 4,379,533 | 4/1983 | Caldwell et al. | 244/120 |
| 4,382,567 | 5/1983 | Fredericks et al. | 244/107 |
| 4,673,147 | 6/1987 | Solomonides | 244/122 A |
| 4,699,336 | 10/1987 | Diamond | 244/140 |
| 5,031,860 | 7/1991 | Ruiz et al. | 244/140 |
| 5,110,071 | 5/1992 | Hunter et al. | 244/137.3 |

*Primary Examiner*—Michael S. Huppert
*Assistant Examiner*—Virha Lissi Ansley
*Attorney, Agent, or Firm*—Connolly & Hutz

[57] ABSTRACT

An aircraft includes a cockpit permanently connected to a fuselage base. At least one fuselage segment is detachably mounted to the support. In case of an imminent crash the segment is detachable from the remainder of the aircraft and can float to safety after being detached by having at least one parachute and an airbag secured to the segment.

20 Claims, 5 Drawing Sheets

SEGMENTED SAFETY AIRCRAFT

BACKGROUND OF THE INVENTION

Air disasters frequently occur upon explosion of an aircraft when there is impact with the aircraft and the ground. The degree of disaster could be significantly reduced if some technique could be developed to separate the aircraft into segments so that, for example, passengers or cargo in a segment which is separated from the portion of the aircraft having the fuel or other combustibles would not be within the vicinity of that portion of the aircraft when the explosion occurs. Although, techniques are known for ejecting crew members in the cockpit from the remainder of the aircraft, techniques have not been developed which are directed to the portions of the aircraft containing passengers or cargo.

SUMMARY OF THE INVENTION

An object of this invention is to provide a segmented safety aircraft which meets the above needs.

A further object of this invention is to provide such an aircraft wherein one or more segments are detachably mounted to the remainder of the aircraft so that the detachable segments could be removed from the remainder of the aircraft and disposed out of its vicinity when the remainder of the aircraft explodes.

A still further object of this invention is to provide such a segmented aircraft wherein each segment is provided with its own parachutes and airbags to minimize any damage caused to the occupants or contents of each segment upon impact with the ground aside from any danger that might otherwise be caused by an explosion.

In accordance with this invention, a segmented safety aircraft comprises a cockpit mounted to the fuselage base support with the remainder of the aircraft carrying the passengers and/or cargo being in at least one compartment or segment mounted on top of the fuselage base support. Each segment is mounted in such a manner that under an emergency condition of an imminent crash the segments can be detached from the remainder of the aircraft and can float to safety by means of parachutes and airbags attached to the segments.

In a preferred practice of this invention a plurality of such segments is mounted to the fuselage base support by riding on a track on the base support. When it is desired to detach the segments the track is pivoted upwardly from its anchored end at the cockpit so as to provide sufficient clearance to permit detachment of the segments. A rocket causes the segment nearest the tail section to discharge in a direction away from the cockpit. Each subsequent segment is connected to the tail segment by connecting cables so that the tail segment then pulls the remaining segments away from the fuselage base support. All of the segments thus detached are preferably connected together by the connecting cables. Each segment includes its own parachutes and airbags to maximize the safety in the landing of the segments.

In a preferred practice of this invention the cockpit would also contain a detachable hatch to permit the pilot and copilot or other occupants of the cockpit to be ejected in a known manner.

DETAILED DESCRIPTION

The present invention is directed to a segmented safety aircraft. The concepts of this invention could be utilized with any type of aircraft from the smaller versions, such as helicopters or propeller type aircraft to larger jumbo sized jet aircraft. The basic concept of the invention is to provide some means wherein at least one portion of the aircraft could be segmented into a sealed compartment and detached from the remaining portion of the aircraft which contains the fuel or other explosive or combustible materials so that the segment could be detached in flight. The segment would have its own floatation means such as parachutes and airbags so that it could float independently to safety detached from and spaced from the remainder of the aircraft so as not to share any of the affects of impact including an explosion which might occur when the remainder of the aircraft crashes.

The invention will be described with particular reference to a jet aircraft having three segmented compartments. It is to be understood that the description of this type of aircraft is merely for exemplary purposes.

Figure 1:
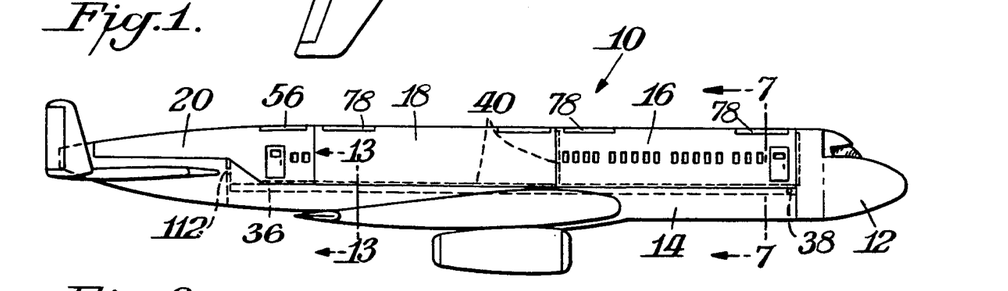
FIG. 1 is a side elevational view of a segmented safety aircraft in accordance with this invention.
Figure 2:
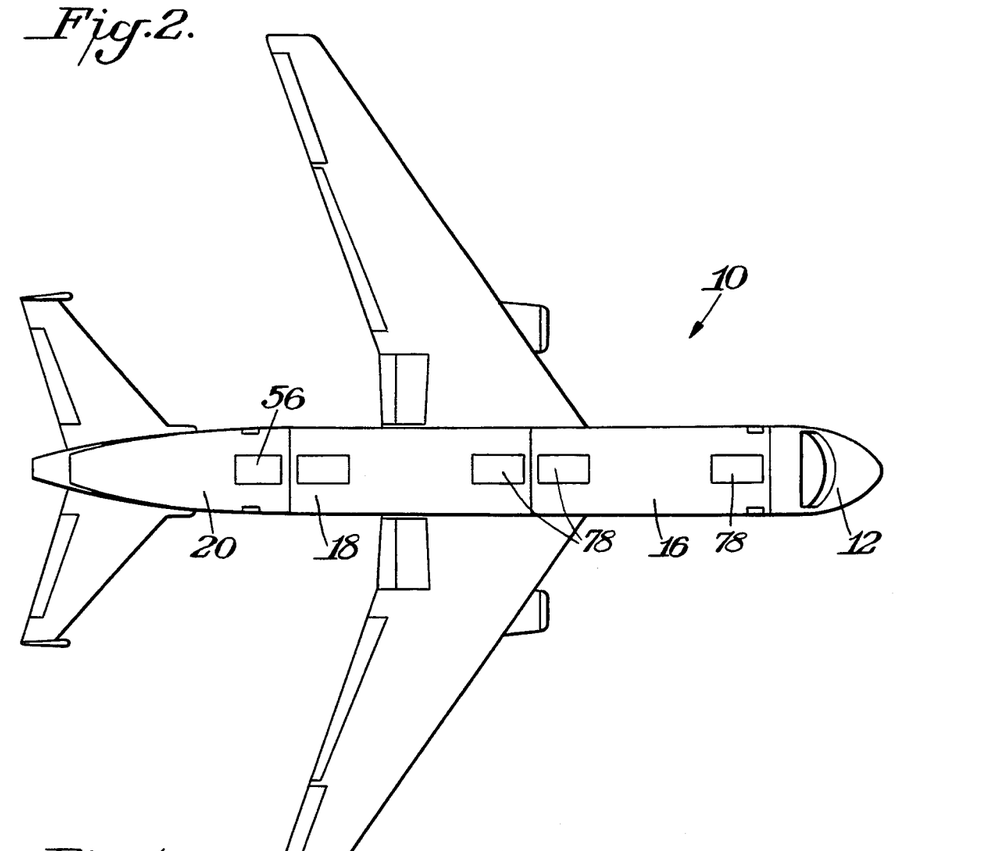
FIG. 2 is a top plan view of the aircraft shown in FIG. 1.
Figure 3:
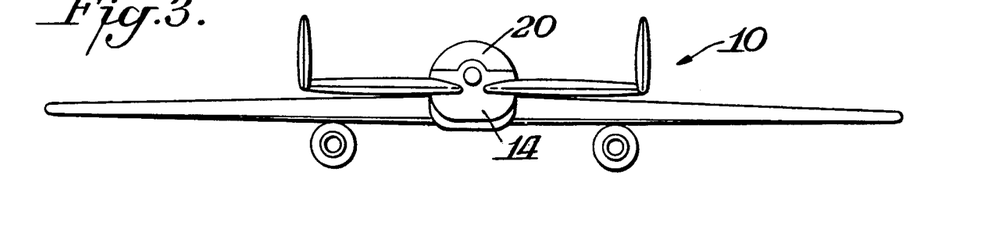
FIG. 3 is a rear elevational view of the aircraft shown in FIGS. 1-2.

FIGS. 1-3 illustrate a segmented safety aircraft 10 in accordance with this invention. As shown therein the aircraft 10 includes a cockpit section 12 at the front of the aircraft permanently connected to a fuselage base support 14. Two individual segments 16,18 are mounted on the fuselage base support with a third tail segment 20 mounted rearwardly of intermediate section 18 on the fuselage base support. For illustrative purposes segment 16 is indicated as a passenger carrying segment while segment 18 is a cargo carrying segment. Segment 20 could be either cargo or passenger carrying. Conversely, all of the segments could be passenger carrying segments or cargo carrying segments.

Figure 11:
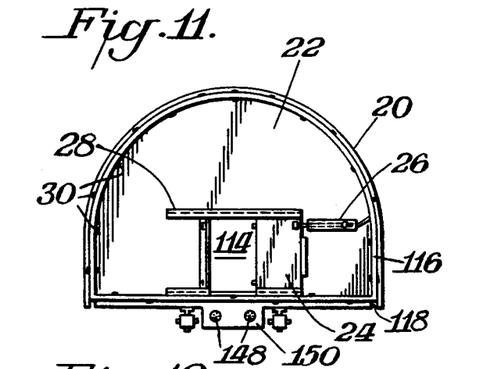
FIG. 11 is a rear elevational view of an individual segment before it is sealed for detachment.

As shown in FIG. 11 each segment has a connecting wall 22 located at its end adjacent to its juxtaposed segment. A movable door 24 is illustrated in FIG. 11 as being in the open condition to permit free movement from one segment to another. Under emergency conditions, as later described, door 24 would be moved to a closed condition to facilitate the sealing of the closed segment so as to transform each segment into a sealed compartment. FIG. 11 for example illustrates door 24 to be mounted to the piston of a gas cylinder 26. When the piston is extended door 24 is closed. As illustrated in FIG. 11 door 24 rides on rails 28. This form of door, however, is not critical. Thus, for example, a pocket door could be used or any other suitable structure which permits the door to be selectively open during normal flight conditions and then quickly closed and sealed during emergency conditions.

During normal flight conditions each segment 16,18,20 is mounted in place by any suitable means such as button seals 30 which are illustrated in the various figures as being inflated seal members.

Figures 4, 5:
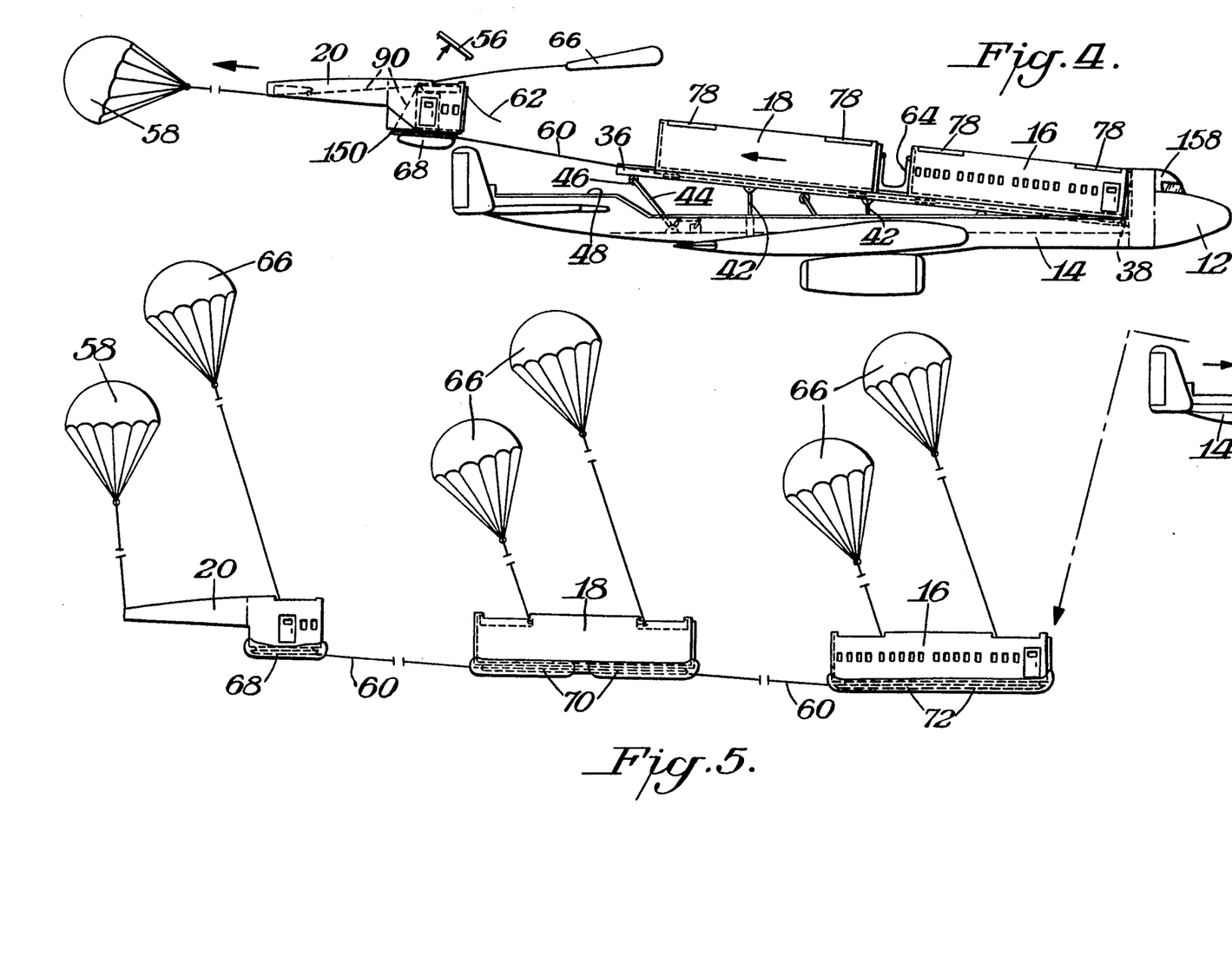
FIG. 4 is a side elevational view of the aircraft shown in FIGS. 1-3 in an initial stage of detachment of the individual segments.
FIG. 5 is a side elevational view similar to FIG. 4 after the segments have been detached.

The floor portion of each segment includes a rail in the form of rollers 32 and roller bearings 34 which are slidable in a track or guide 36 secured to the fuselage base support for purposes later described. Track 36 extends generally the entire length from cockpit section 12 to a portion intermediate the length of tail segment 20. FIG. 4, for example, shows track 36 to be pivoted at one end 38 and the free end is clearly shown to extend beyond segment 18.

The various segments are sealed together in any suitable manner such as by tongue and groove air seals 40 so that during normal conditions a unitary aircraft results.

In accordance with this invention during emergency conditions when a crash appears imminent the individual segments are detached from the remaining portion of the aircraft so that the individual segments can independently float to safety at a location distanced from the remainder of the aircraft and thus be unaffected by any crash or explosion resulting from the aircraft hitting the ground or other surface.

Figure 16:
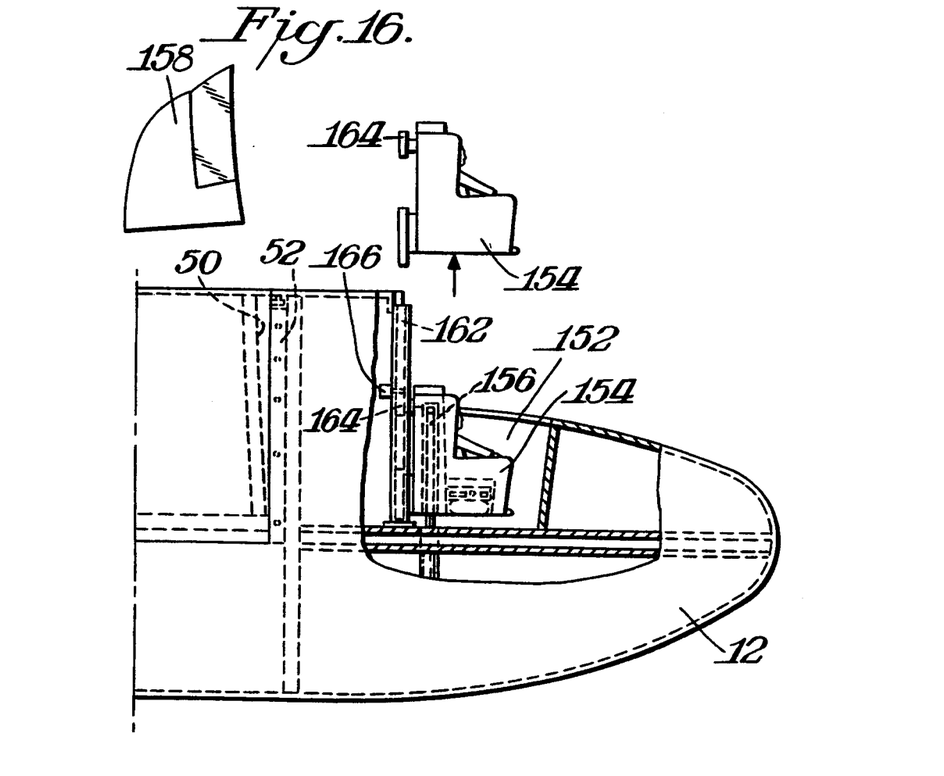
FIG. 16 is a side elevational view partly in section showing the cockpit portion of the aircraft of FIGS. 1-15 during ejection.

In order to provide sufficient clearance to permit the segments to be detached, it is necessary to elevate track 36. This could be accomplished in any suitable manner. In the form shown in FIG. 4 a plurality of air or gas cylinders 42 is located at spaced portions between fuselage base support 14 and track 36. In addition to the gas cylinders 42 a plurality of pivoted support members 44 are also provided each with a roller 46 for riding under the track 36. Thus, when the pistons are extended from the cylinders track 36 is pivoted at its anchored end 38 adjacent the cockpit with the end under tail segment 20 being elevated upwardly a sufficient distance to clear the raised portion 48 of fuselage base support 14. During this pivotal movement of track 36 the segments 16, 18 and 20 remain juxtaposed each other. Accordingly, it is necessary to take into account the pivotal movement of these segments with the fixed cockpit. FIG. 16, for example, illustrates how the front wall 50 of first segment 16 is sloped away from the upper portion of cockpit section 12 to permit wall 50 to then pivot toward the cockpit portion 12 during the raising of track 36. A flexible end wall feel 52 of any suitable construction such as a tongue and groove air seal could be provided in the space provided between sloping wall 50 and the adjacent vertical wall of cockpit 14.

After track 36 had been elevated sufficiently to clear fuselage base support 14 the individual segments, 16, 18 and 20 are in a position to be detached from the remainder of the aircraft. This is accomplished by providing tail segment 20 with any suitable ejecting force. In the embodiment illustrated in FIG. 12 this ejecting force is provided by means of a rocket 54 which would provide sufficient thrust to direct tail segment 20 outwardly away from fuselage support 14. A first parachute 58 is released from the rocket compartment. Generally, concurrently with the firing of rocket 54 a hatch 56 is released from the top of tail segment 20 to permit the ejection of a second parachute 66 when the first parachute 58 is ejected from the bottom of tail section 20.

A connecting cable 60 and a shear cable 62 interconnect segment 20 with intermediate segment 18. Cable 60 also interconnects segment 18 with end segment 16 while a second shear cable 64 interconnects segments 18 and 16. The purpose of the double cable arrangement is to provide a stable connection between the adjacent segments during the discharge period so that as tail segment 20 is thrust outwardly it pulls with it by means of cables 60 and 62 the adjacent intermediate segment 18. Continued outward thrust in turn causes cables 60 and 64 to pull segment 16 outwardly so that the three segments remain joined together. Since it is desired to provide a suitable distance between the individual segments during free flight downward it is only necessary to have the cable 60 remain interconnecting the segments. The shear cables 62 and 64 function only for purposes of stability during the initial detachment of the segments. Thus once segment 20 begins to move away from segment 18 a distance greater than the length of shear cable 62, shear cable 62 is then broken. This break of cable 62 is illustrated in FIG. 4 although in actual practice the break would occur at a slightly later period in time. Similarly, once the distance between segments 18 and 16 reaches the length of cable 64, cable 64 would also break. Each of the segments would have its own sets of parachutes 66, 66 which would be exposed upon release of an appropriate hatch 78 as later described.

During the detachment of the segments 16, 18 and 20 a plurality of airbags 68, 70,70 and 72,72 located at the bottom of the respective segments would be inflated. The airbags serve the multiple functions of lightening the load as the segments float downwardly and also cushioning the landing as well as providing a means of flotation should the landing occur on water.

Figure 12:
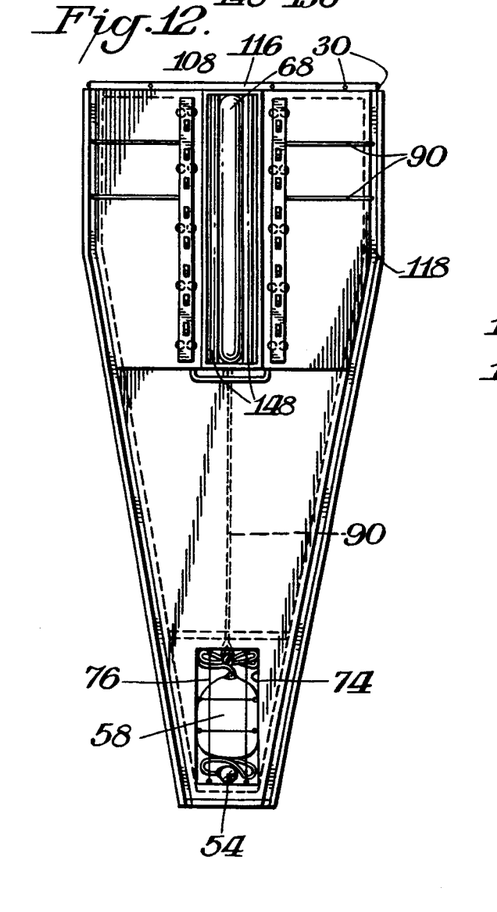
FIG. 12 is a bottom plan view of the tail segment of the aircraft shown in FIGS. 1-11.

As illustrated in FIG. 12 a chute and rocket compartment 74 is provided in the bottom of tail segment 20. The compartment is closed by a rupturable netting 76. During emergency conditions the rocket 54 is ignited causing the netting to rupture and chute 58 falls from compartment 74 to thereby open as illustrated in FIGS. 4 and 5.

Figure 7:
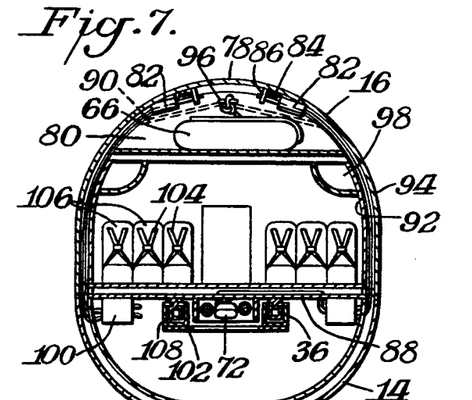
FIG. 7 is a cross-sectional view taken through FIG. 1 along the line 7—7.
Figure 8:
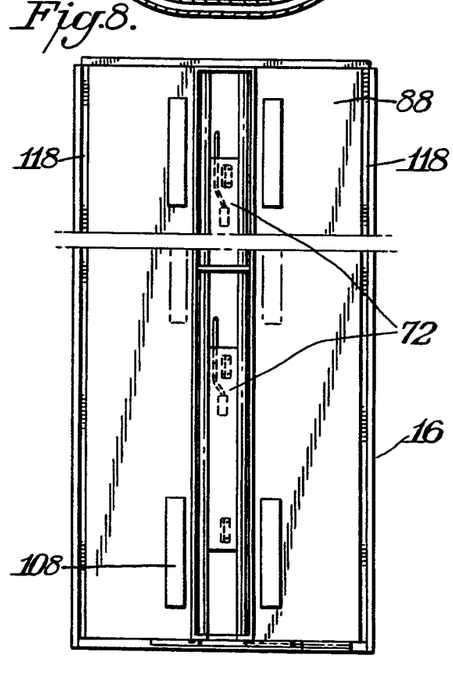
FIG. 8 is a bottom plan view of the portion of the aircraft shown in FIG. 7.

FIG. 7 illustrates the structure of passenger segment 16. As shown therein a hatch 78 closes the upper storage compartment 80. Hatch 78 is made detachable in any suitable manner. For example, as illustrated a plurality of cylinders 82 is provided having the extended pistons 84 project through holes in flanges 86 depending from hatch 78. When, however, the pistons are retracted from engagement with flanges 86, flange 78 is no longer being held in place and is moved freely away from compartment 80. The opening of compartment 80 by the removal of hatch 78 thereby exposes parachute 66 so that the parachute could be opened as illustrated in FIGS. 4–5. Such a compartment and hatch arrangement would be provided for each segment where there is a parachute. Thus, for example, hatch 56 would be released in the same manner.

FIG. 7 also illustrates a deflated airbag 72 mounted below the floor 88 in segment 16. Airbag 72 is inflated as later described upon detachment of segment 16.

An advantageous feature of this invention is that each segment includes a cable structure 90 between the inner skin 92 and the outer skin 94 of the segment. The cable structure 90 completely encircles the segment to reinforce the segment particularly in the portion of the segment having the eye 96 used for fastening the respective parachute to that segment.

Segment 16 as well as other segments would also contain compartments 98 which would house oxygen masks and could be used for other storage purposes. It is within the concept of this invention to also include some means of taking into account the shock that might result to passengers under emergency conditions when the aircraft is visibly being segmented. For example, a muscle relaxant could be mixed with the oxygen so as to minimize shock particularly to persons having weakened heart conditions during the emergency condition. If desired, an anesthetic or more severe means could be used by mixing with the oxygen to completely immobilize or to relax the passengers. As a side feature these concepts of the invention could also be used in cases of air piracy where the aircraft could be segmented and an air-hijacker would be immobilized or knocked out either by failure to get sufficient oxygen or by breathing in the immobilizing mixture which is intended to immobilize the passengers.

FIG. 7 also illustrates the inclusion of suitable airtanks 100 mounted to and below floor 88 in the compartments formed between the inner skin 92 of the fuselage base support and the floor 88. The airtanks are used to control the inflation, deflation and operation of the various air containing components such as the airbags, airseals and air cylinders.

FIG. 7 also illustrates a web material 102 to connect the two side portions of track 36 below the floor 88. FIG. 7 further illustrates the conventional safety belt harnesses 104 provided for each passenger seat 106.

Figure 9:
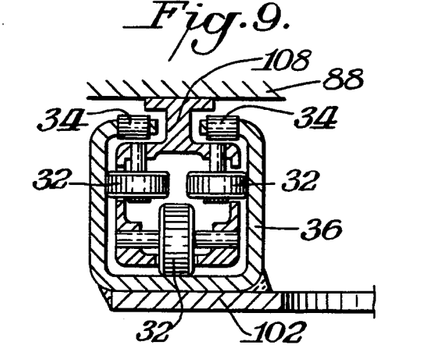
FIG. 9 is a cross-sectional view in elevation showing the track arrangement for the segments in the aircraft of FIGS. 1-8.
Figure 10:
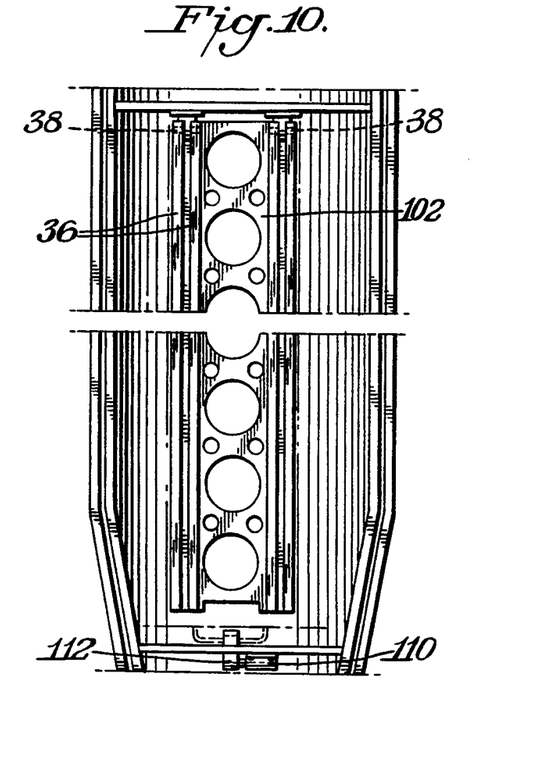
FIG. 10 is a top plan view of the arrangement shown in FIG. 9.

FIG. 9 best illustrates the details of the track and rail arrangement at the bottom of the segments. As shown therein, a T-guide 108 is mounted to the floor 88 of each segment. The T-guide provides support for the various rollers 32,32 which roll against the inner surface of the substantially enclosed track 36. Track 36 includes roller bearings 34. As shown in FIG. 7 a pair of spaced tracks sections is mounted below the segments. The track segments are interconnected by web 102 as illustrated in FIG. 10. This arrangement permits the entire track to be pivoted upwardly from its anchored pivot point 38 and then permits the segments to move away from the anchored pivot point by the rollers 32 rolling on track 36.

An airmotor 110 is mounted at the end opposite pivot connection 38 and actuates a rotatable latch 112 which would be moved to its unlatching position when it is desired to elevate track 36.

FIG. 11 illustrates an end of each segment. As previously discussed the segments are in communication with each other by an open doorway 114 until door 24 is moved to its closed sealing condition. In addition to the use of air cylinder 26 to control the open or closed position of door 24 the door may be spring biased to an open or to a closed position to cooperate with or act against the force of cylinder 26.

Figure 13:
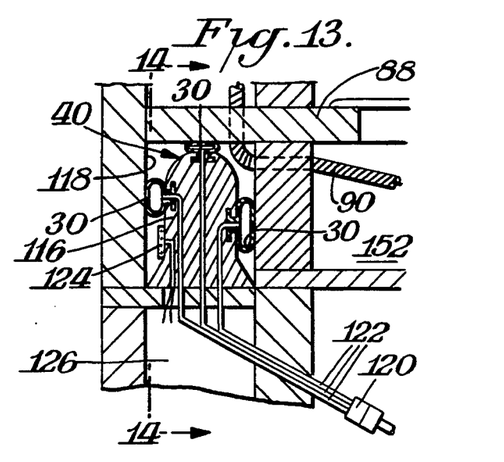
FIG. 13 is a cross-sectional view taken through FIG. 1 along the line 13—13.

FIG. 13 illustrates the longitudinal tongue and groove airlock 40. As shown therein the tongue and groove airlock 40 includes a tongue section 116 and groove section 118. An air connector 120 is illustrated as including the various air lines 122 which lead to the individual button seals 30. FIG. 13 also illustrates the inclusion of a heat tape 124 which would maintain a suitable temperature above freezing.

Figure 14:
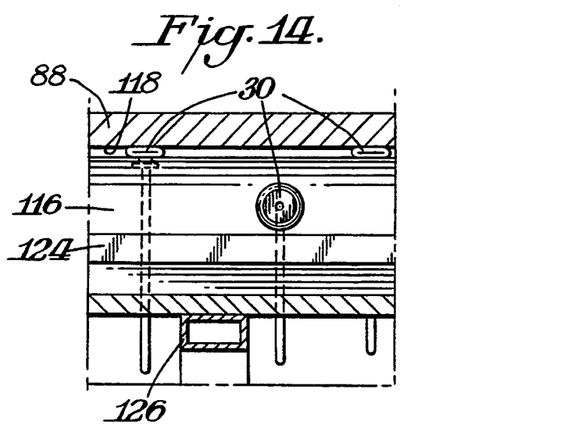
FIG. 14 is a cross-sectional view taken through FIG. 13 along the line 14—14.

FIG. 14 is a side elevational sectional view of the same structure of FIG. 13 and further illustrates the frame ribs 126.

Figure 15:
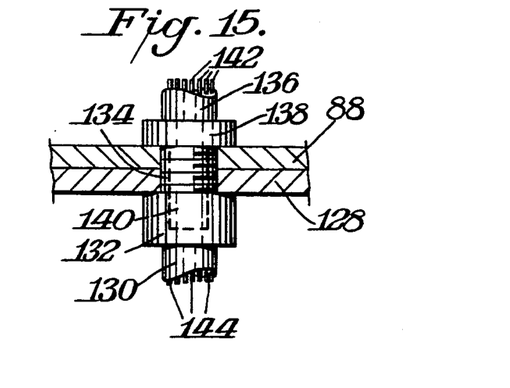
FIG. 15 is a cross-sectional view showing a preferred form of connector for use in the aircraft of FIGS. 1-14.

FIG. 15 illustrates a particularly advantageous connector used with this invention. As shown therein the connector would connect the floor 88 of the detachable segment with a wall 128 in a further portion of the aircraft. This is accomplished by having a cable carrier 130 in tubular form carry individual cables 144, such as used for airconditioning, communications, fibre optics and the like. The connection would be made by threadably engaging nut 132 with threaded shaft 134 at the fuselage base support side thereof. The connector would include a hollow cable tube 136 at the segment side having a abutment member 138 which abuts against the top of floor 88. The hollow cable tube includes a reduced diameter portion 140 which fits into a corresponding recess in nut 132. The individual electrical connectors 142 or the like in the segment portion above floor 88 would detachably connect to corresponding connectors 144 in tube 130. Such connection could be in any suitable manner such as a male/female connection. Thus, during normal flight conditions the individual electrical connectors 142 are each connected to a corresponding connector 144. When rail 36 is elevated, however, floor 88 is raised away from wall 128. The connection between the electrical connections 122 and 144 are broken and floor 88 could be moved away from wall 128.

FIG. 11 shows a further feature of the invention wherein tubes 148 are provided below each segment for storing the connector cables 60.

In practice, parachute 58 would function as a drag chute in connection with rocket 52 since this represents the first of the segments that is discharged. The bottom of tail section 20 may also include a skid 150.

A further feature of this invention shown in FIG. 13 is to provide a sealed pressurized compartment 152 below the floor 88 of each segment.

Figure 6:
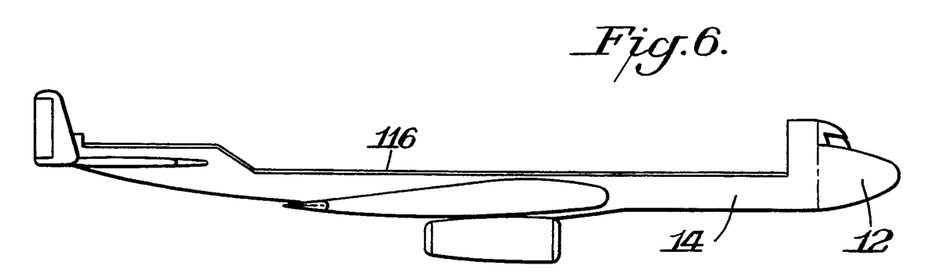
FIG. 6 is a side elevational view of the portion of the aircraft remaining after the segments have been detached.

The operation of the various mechanisms utilized for detaching the segments 16, 18 and 20 would be initiated by the pilot or would be automatically initiated by the sensing of some emergency condition. For example, an air supply tank could be provided at the turbines and the actuation of the emergency conditions would be automatically initiated if the air supply is cut off. Once the emergency conditions are initiated the various operations take place in the proper sequence commencing with the simultaneous sealing of the segments into air tight compartments and the elevation of track 36. The rocket 54 is fired. Hatches 56 and 78 are opened and the various chutes 58 and 66 are exposed. Tail segment 20 is first ejected and then pulls along with it segments 18 and 16. The segments then float independently toward the ground as illustrated in FIG. 5 completely free from and spaced from the remainder of the aircraft. FIG. 6 illustrates the remainder of the aircraft after these segments have been detached.

Figure 17:
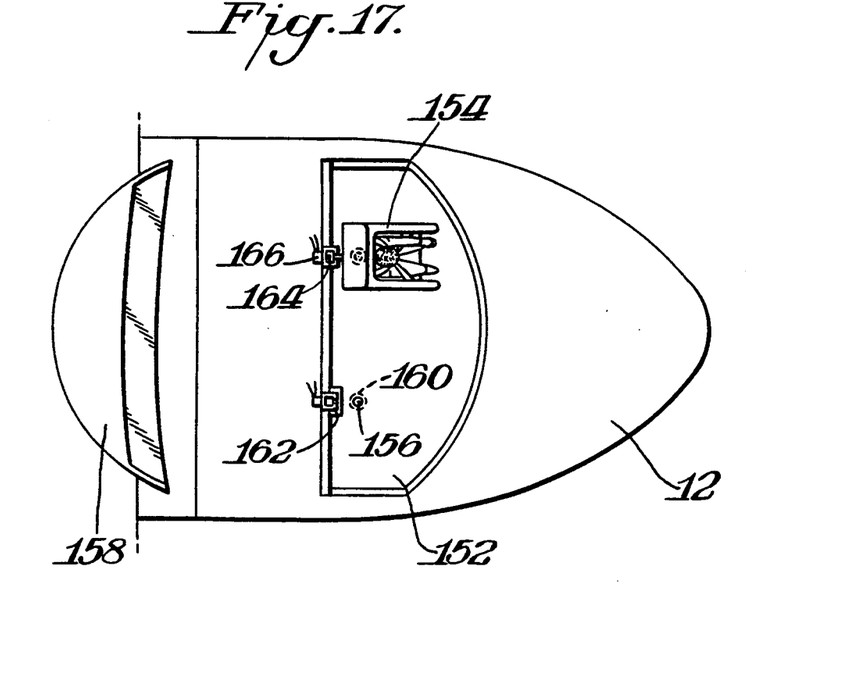
FIG. 17 is a top plan view of the cockpit portion shown in FIG. 16.

FIGS. 16–17 show the cockpit portion 12 of the aircraft 10. Cockpit portion 12 includes means to permit the pilot and copilot or other persons in the cockpit to be ejected once segments 16, 18 and 20 have been detached. Such ejection could be accomplished in any suitable manner. For example, in the form illustrated an ejection seat 154 is provided for each occupant. The seat 154 is guided on guide rod 156 for ejection. Once the hatch 158 has been released and moved clear of the front of the cockpit the power for the ejection of seat 154 is from a rocket 160. The guiding of the ejection seat is also accomplished by track 162 with T-guides 164. As also illustrated in FIG. 16–17 an air cylinder 166 is provided to control the movement of the T-guides. Ejection of the occupants from the cockpit, except for the pilot or one occupant could be done generally simultaneously with or slightly after the detachment of segments 16, 18 and 20. At least one occupant such as the pilot, however, should remain in the cockpit portion 12 a sufficiently long period of time to assure that there has been proper disengagement of the segments 16, 18 and 20 and to minimize the damage that the aircraft would cause in its ultimate crash. Each seat 154 would also be provided with a parachute to safely guide the crew members back to earth.

As can be appreciated the invention thus provides a means of separating an aircraft segment away from the main portion of the aircraft to minimize any injury or damage that would otherwise be caused by the passengers or cargo remaining in an intact aircraft when the aircraft crashes.

The segmented aircraft of this invention has a particularly advantageous side benefit unrelated to the safety features. FIG. 6 illustrates the aircraft after the segments have been detached. In that condition the aircraft could still be flown from one location to another. This makes it possible to utilize the aircraft with replaceable segments as an economical way of transporting cargo. Thus, for example, the aircraft could be flown to a particular location where its cargo carrying segments could be detached and replaced by other preloaded cargo carrying segments. Alternatively, the aircraft could be flown without any attached segments while in the condition shown in FIG. 6. Preloaded segments could then be attached after landing. In this practice of the invention it is not necessary to seal the segments into individual sealed compartments or to provide the segments with parachutes or airbags. (As a safeguard these features may be included.) In its broad practice all that is necessary is that the segments are selectively detachable and attachable. The detaching could be accomplished by raising the tracks and then utilizing any pulling force to remove the tail segment and other segments. If the segments are interconnected by a cable, removing the tail segment will cause the remaining segments to be removed. When the segments are not interconnected, each segment would be individually removed from the tracks. The reverse procedure would be followed to mount the replacement segments on the tracks.

The concept of a segmented aircraft thus provides not only safety features, but also the possibility of lighter loads. This would be done by flying the aircraft and only including the segments when the segments are loaded with, for example, cargo. Otherwise the aircraft could be flown using the fuselage base without any segments mounted thereto.

What is claimed is:

1. In an aircraft having a fuselage with a cockpit portion at one end and a tail section at the other end, the improvement being in that said fuselage includes a fuselage base support, said fuselage further including at least one segment detachably mounted to said base support, sealing means for selectively sealing said segment during emergency conditions to create a sealed compartment, means for moving said segment away from said base support during emergency conditions to cause said segment to separate from the remainder of said aircraft, at least one parachute mounted to said segment for opening during emergency conditions to float said segment in descent, a generally longitudinal guide fixedly mounted on said base support, and said segments riding on said guide to facilitate each segment being separated in a longitudinal direction away from said cockpit portion.

2. The aircraft of claim 1 including at least one air bag mounted to said segment to render said segment more floatable and to cushion the landing of said segment and to comprise float means when said segment lands on water.

3. The aircraft of claim 2 including a plurality of said segments, one of said segments being a tail segment located in the tail section of said aircraft, and at least one further segment forwardly of said tail segment.

4. The aircraft of claim 3 wherein said segments are interconnected by cable means.

5. The aircraft of claim 1 wherein said guide is elevatable to facilitate each segment being separated from the remainder of said aircraft.

6. The aircraft of claim 5 including a cockpit portion at the front of said aircraft, said guide being pivotably mounted at said cockpit portion, and the end of said guide opposite said pivotal mounting being elevatable.

7. The aircraft of claim 6 including a propulsion device at said tail segment to comprise said moving means.

8. The aircraft of claim 7 wherein a parachute storage compartment is located at the top of each segment, said parachute being mounted in said parachute storage compartment, an openable hatch closing said parachute storage compartment, and an airbag storage compartment located at the bottom of said segment and exposed when said segment is separated from said base support.

9. The aircraft of claim 8 wherein each of said segments includes an outer skin and an inner skin, and reinforcing cables being located between said outer skin and said inner skin and extending around said segment.

10. The aircraft of claim 9 wherein said cockpit portion includes ejection seats for the crew in said cockpit portion.

11. The aircraft of claim 10 including movable doors for selectively sealing said segment to comprise said sealing means.

12. The aircraft of claim 1 wherein each of said segments includes an outer skin and an inner skin, and reinforcing cables being located between said outer skin and said inner skin and extending around said segment.

13. The aircraft of claim 19 wherein a parachute storage compartment is located at the top of each segment, said parachute being mounted in said parachute storage compartment, an openable hatch closing said parachute storage compartment, and an airbag storage compartment located at the bottom of said segment and exposed when said segment separated from said base support.

14. The aircraft of claim 1 wherein said segment includes two of said parachute cased in webbing material, and said two parachutes including a drag parachute.

15. The aircraft of claim 1 wherein said segment includes means for feeding a muscle affecting gas into said segment.

16. In an aircraft having a fuselage, the improvement being in that said fuselage includes a fuselage base support, an elevatable generally longitudinal guide fixedly mounted on said base support, said fuselage further including at least one segment for carrying cargo, said segment being movably mounted on said guide to permit said segment to be selectively detached from said guide and said base support and to be replaced by a different segment, and said aircraft being flyable with and without any segments mounted to said base support.

17. In an aircraft having a fuselage, the improvement being in that said fuselage includes a fuselage base support, said fuselage further including at least one segment detachably mounted to said base support, sealing means for selectively sealing said segment during emergency conditions to create a sealed compartment, means for moving said segment away from said base support during emergency conditions to cause said segment to separate from the remainder of said aircraft at least one parachute mounted to said segment for opening during emergency conditions to float said segment downwardly, and feed means in said segment for feeding as muscle affecting gas into said segment.

18. The aircraft of claim 17 wherein said muscle affecting gas is a muscle relaxant to minimize shock to passengers in said segment.

19. The aircraft of claim 17 wherein said muscle affecting gas is to render immobile passengers including any hijackers in said segment.

20. The aircraft of claim 1 wherein said cockpit portion includes ejection seats for the crew of said cockpit portion.

* * * * *